Jan. 2, 1940.   E. S. JEFFERIES   2,185,767
MEASURING AND INTEGRATING DEVICE
Filed Dec. 24, 1934   6 Sheets-Sheet 3
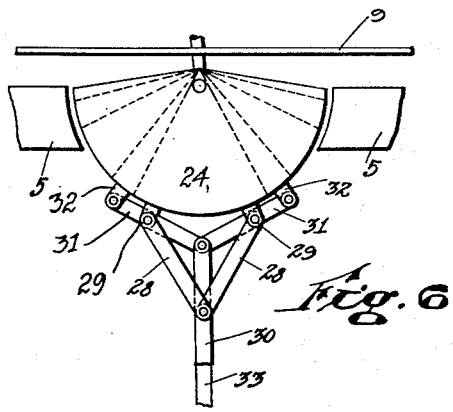
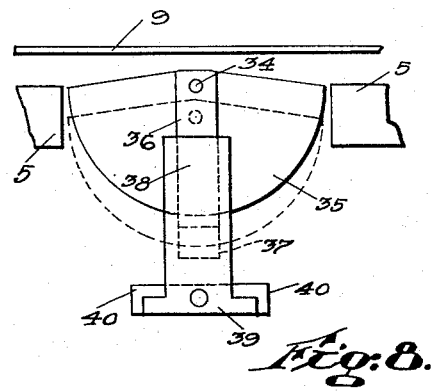
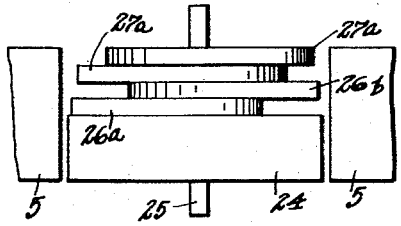
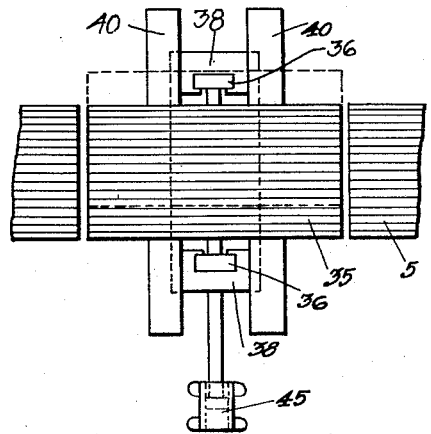
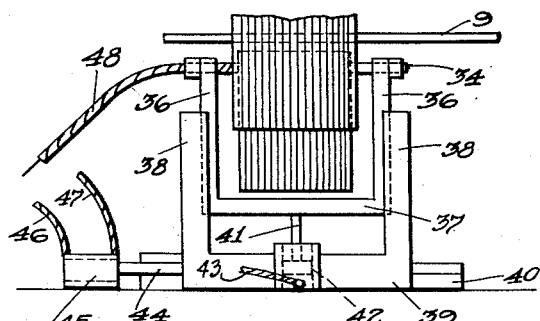
Inventor:
Ernest S. Jefferies
By Owen W. Kennedy
Attorney Inventor:
Ernest S. Jefferies
By Owen N. Kennedy
Attorney

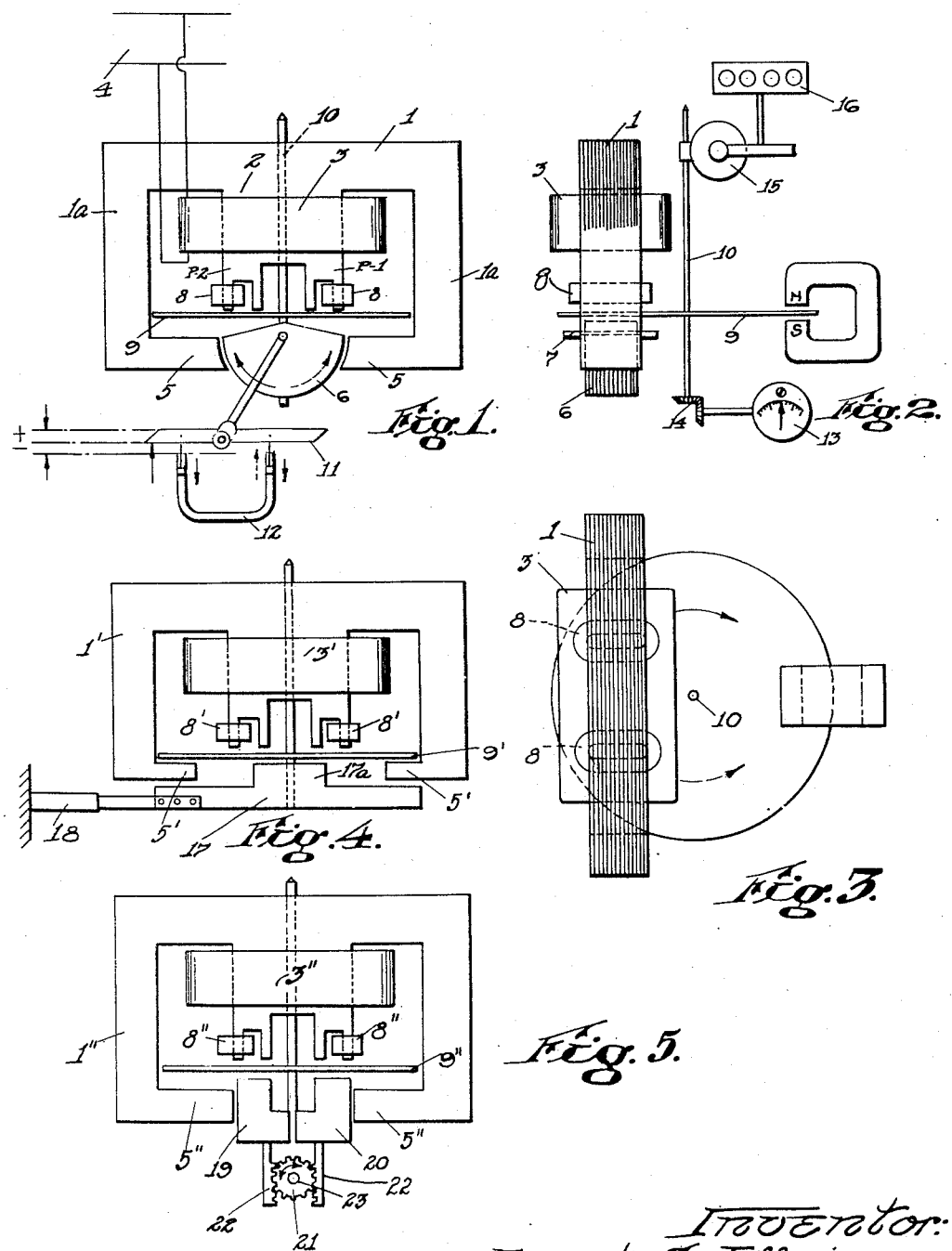

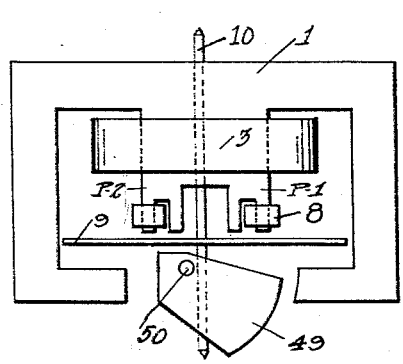
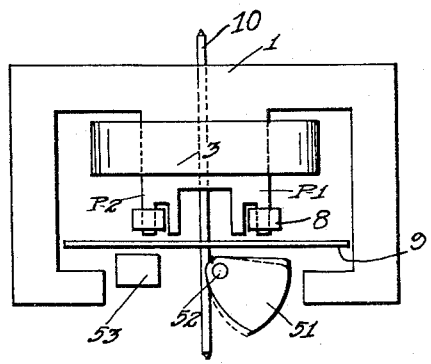
Fig. 11.  Fig. 12.
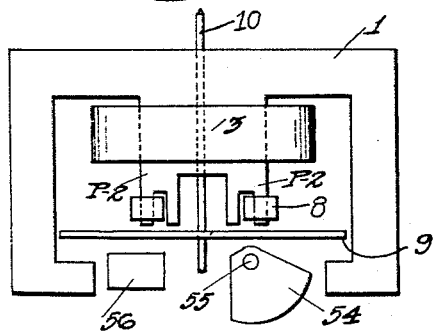
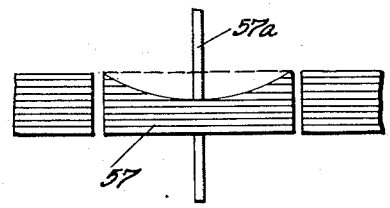
Fig. 13.  Fig. 14.
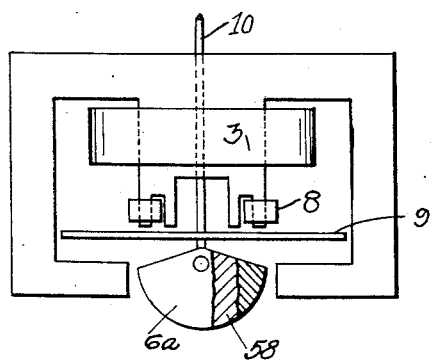
Fig. 10.

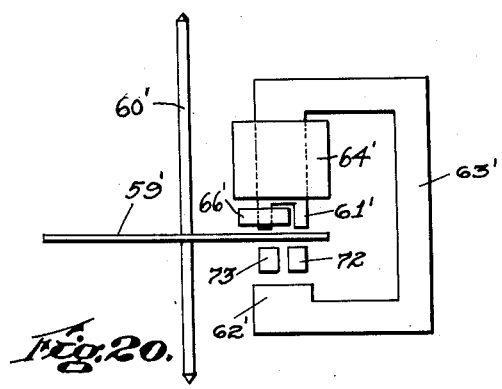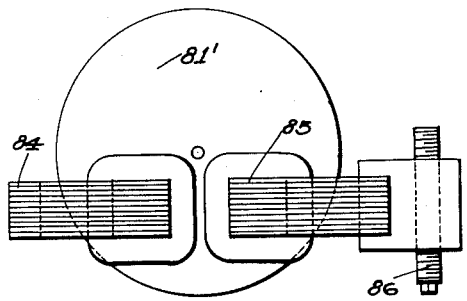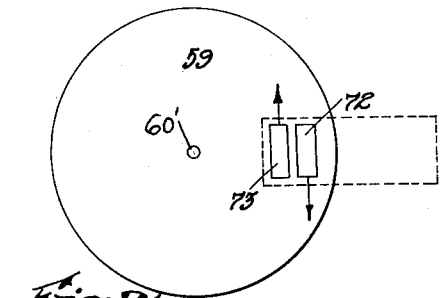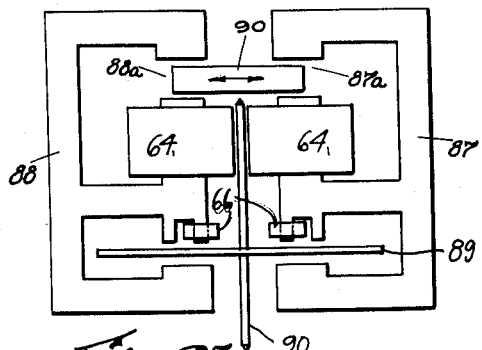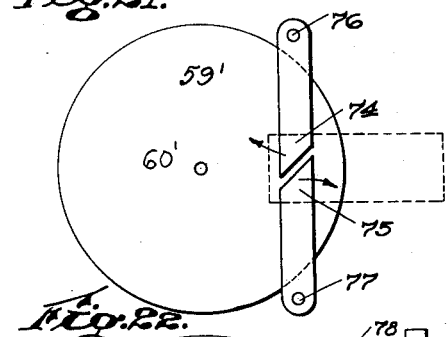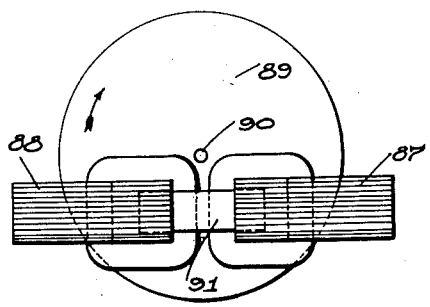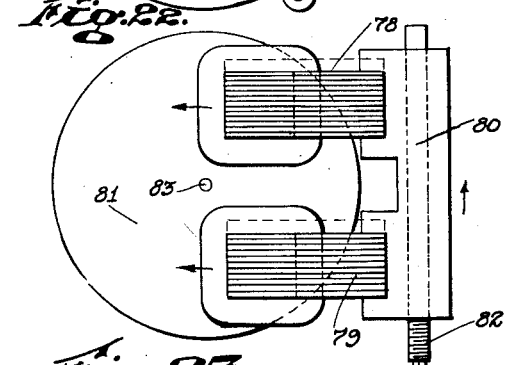

Jan. 2, 1940.  E. S. JEFFERIES  2,185,767
MEASURING AND INTEGRATING DEVICE
Filed Dec. 24, 1934   6 Sheets-Sheet 6

Inventor:
Ernest S. Jefferies
By Owen W. Kennedy
Attorney

Patented Jan. 2, 1940

2,185,767

UNITED STATES PATENT OFFICE 2,185,767

MEASURING AND INTEGRATING DEVICE

Ernest S. Jefferies, Marion, Mass.

Application December 24, 1934, Serial No. 758,928

2 Claims. (Cl. 177—351)

The present invention relates to an improved measuring and integrating device that is adapted to accurately measure and integrate the degree and extent of any measurable quantity or magnitude, i. e., anything that may be greater or less than anything else of the same class, such as a length, area, volume, weight, angle, velocity or tension.

Briefly stated, the invention resides in varying the distribution of a magnetic flux in accordance with the duration and degree of the magnitude under consideration, whereby the torque imparted to a movable element is at every instant proportional to the magnitude being integrated. To this end, the invention contemplates the utilization of the variations of either the intensity or the torque component of the magnetic flux reacting on the movable integrating element, as well as the provision of means for rendering the element also responsive to variations of other factors such as temperature, pressure or humidity, which may affect the magnitude being integrated. The above and other advantageous features of the invention will hereinafter more fully appear from the following description taken in connection with the accompanying drawings, in which:

Fig. 1 is a view in front elevation of a device embodying the invention.

Fig. 2 is a side view of the parts shown in Fig. 1.

Fig. 3 is a plan view of the parts shown in Fig. 2.

Figs. 4 and 5 are views similar to Fig. 1, illustrating modifications in the manner of varying the distribution of the magnetic flux.

Figs. 6 to 10 inclusive, are diagrammatic views illustrating the control of the device of Fig. 1, as modified by additional variable factors under consideration.

Figs. 11 to 14 inclusive, and 1a are diagrammatic views illustrating modifications in the form of the magnetic flux controlling member shown in Fig. 1.

Figure 15:
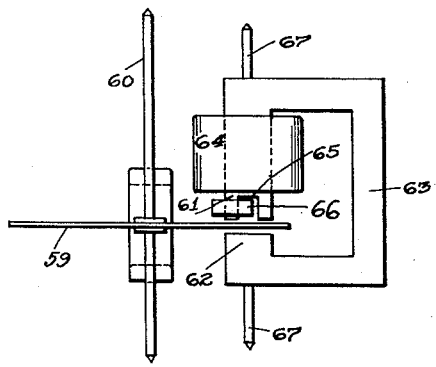

Fig. 15 is a view in front elevation of a device similar to the device of Fig. 1, but operating on a different principle.

Figure 16:
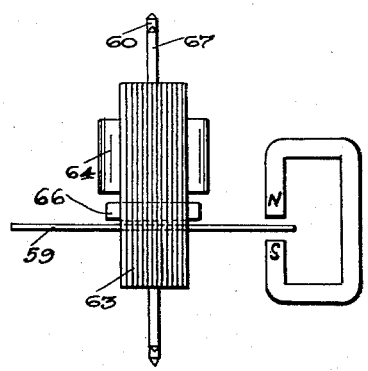

Fig. 16 is a side view of the parts shown in Fig. 15.

Figure 17:
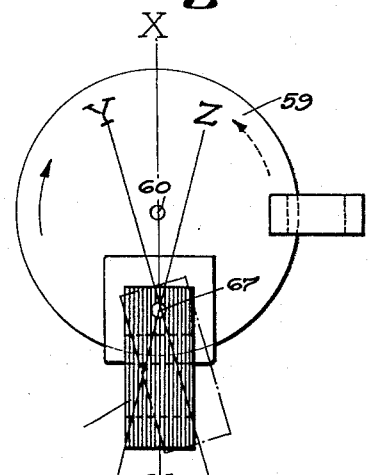

Fig. 17 is a plan view of the parts shown in Fig. 16.

Figure 18:
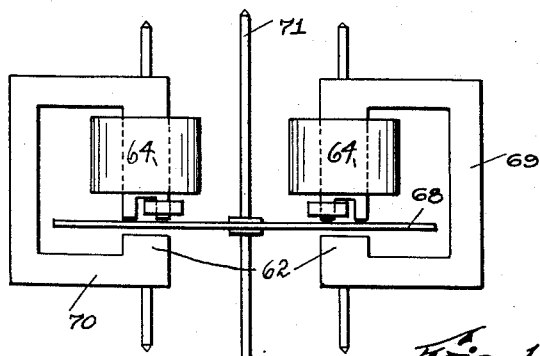
Figure 19:
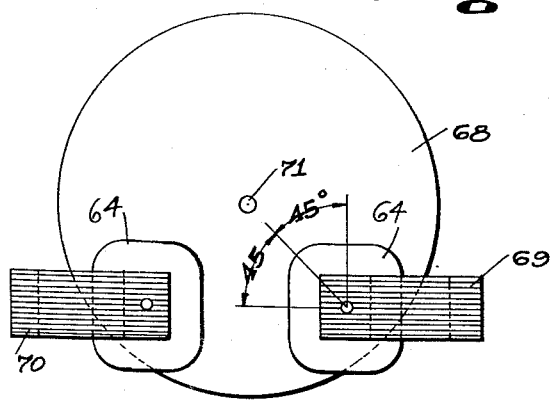

Figs. 18 and 19 are views in front elevation and in plan respectively, showing a modification of the device of Fig. 15.

Figs. 20, 21 and 22 are diagrammatic views, showing means for rendering the device of Fig. 15 responsive to additional variable factors.

Figs. 23 and 24 are plan views, illustrating further modifications in the manner of controlling a device operating on the same principle as the device of Fig. 15.

Figs. 25 and 26 are views in front elevation and in plan, respectively, showing still further modifications.

Figs. 27 to 31 inclusive, are views showing the invention incorporated in a device having a different type of rotor.

Like reference characters refer to like parts in the different figures.

Referring first to Figs. 1, 2 and 3, one embodiment of the invention consists of a magnetic core 1 providing a central pole portion 2 surrounded by a winding 3, the terminals of which are energized from any suitable voltage source 4. The core 1 provides side legs 1a terminating in oppositely extending polar projections 5 that are spaced apart with the gap between them substantially filled by a sector-shaped magnetic control member 6 rotatably mounted on a shaft 7.

The main pole 2 provides projections P—1 and P—2, each slotted to receive a short circuited shading coil 8, the coils 8 being symmetrically disposed with reference to the central axis of the core 1, as is evident from a consideration of Fig. 3. A disk armature 9 is rotatably mounted on a vertical shaft 10, with a portion of the armature disposed between the faces of the poles 2 and 5 and the magnetic member 6.

With the parts occupying the position of Fig. 1, energization of the winding 3 of a given voltage causes a certain amount of magnetic flux to flow through the disk 9 between the faces of the pole 2 and the opposed faces of the poles 5 and the control member 6 therebetween. Furthermore, currents induced in the windings 8 produce additional fluxes in quadrature relation, which acting on the disk 9 tend to develop a torque therein. However, since the whole magnetic structure is symmetrical with reference to the pivotal axis of the disk 9, the forces tending to rotate the disk are equal and opposite, and the disk remains stationary with the flux distribution, as shown in Fig. 1.

Upon turning of the magnetic control member 6 about its shaft 7, the flux distribution in the air gap between the pole faces is immediately changed, turning of the member 6 in the direction of the full arrow causing an increase in the flux on the left hand side of the axis of the disk 9 with a corresponding decrease in the flux intensity on the right hand side. When this occurs, the forces acting on the disk 9 become unbalanced, and the disk starts to turn in a clockwise direction, as indicated by the full arrow in Fig. 3. Due to the damping effect of the magnet N—S on the disk 9, its rate of rotation will be directly proportional to the angle through which the member 6 is turned, within the limits of the air gap. Turning of the member 6 in the direction of the dotted arrow from the position of Fig. 1 causes just the opposite effect and results in rotation of the disk in a counterclockwise direction, as indicated by the dotted arrow in Fig. 3. Therefore, for any position of the magnetic control member 6, other than that shown in Fig. 1, the disk 9 will have a definite rate of rotation in one direction or the other.

As illustrative of the utility of the invention in measuring and integrating a magnitude in terms of the degree and extent of a mechanical displacement, there is shown diagrammatically in Fig. 1 a particular use of the device for this purpose. To this end, the shaft 7 of the magnetic member 6 carries oppositely extending arms 11, which bear through suitable connections 11a on the ends of a U-shaped column of mercury 12, which column is subject to displacements in response to variable factors. That is to say, the mercury column 12 may be utilized to indicate the pressure differential between different points by relative displacement of the ends of the column with respect to each other. However, as long as there is no pressure differential, the ends of the column will remain at the same height and the magnetic control member 6 will remain in its neutral position with no rotative force being exerted on the disk 9, by the balanced fluxes.

However, upon any change in the pressures acting on the column 12 a difference in level will be established, and the extent of the pressure differential at any instant will be reflected by rotation of the disk 9 in one direction or the other at a certain rate. As shown in Fig. 2, the rotation of the disk 9 can be indicated directly as a rising or falling value by means of a suitable speed responsive instrument 13 connected to the shaft 10 by gearing 14, or if desired, the pressure differential, as recorded by the column 12 over any given period of time, can be integrated by connecting the shaft 10 through gearing 15 to a revolution recording device 16, such as is employed in consumption meters.

When utilizing the device of the invention for the purpose of integrating the displacements of the column 12, over any given period of time, it is possible to obtain an absolutely accurate integration of the instantaneous values of the pressure differentials shown by the column over any period under consideration. Thus, assuming that falling of the right hand leg of the column 12 is considered as a positive movement, while falling of the left hand leg is considered as a negative movement, it necessarily follows that as the pressure differential varies within the limits indicated by the dot and dash lines of Fig. 1, each and every variation of the differential will cause an increase or decrease in the speed of the disk in one direction of rotation or the other. Therefore, the device 16 will accurately record the net change in the pressure differential over any period of time. Any record thus obtained by use of my improved device will be far more accurate than any series of computations carried on to determine the net change as a result of readings taken at stated intervals, no matter how closely spaced these intervals may be.

Referring now to Fig. 4, there is shown a modification of the device, in which the mounting of the winding 3' and the coils 8' on the core 1' is the same as in Fig. 1. In the modified construction, however, the polar projections 5' are spaced farther apart and a magnetic control member 17 is movable longitudinally in the space between the projections 5'. The member 17 provides a portion 17a of greater cross-section than the remainder thereof and in the neutral position of this member shown in Fig. 4, the distribution of the fluxes passing through the disk 9' is symmetrical with respect to the axis of the disk and the disk exhibits no tendency to rotate. However, upon displacement of the member 17 to the right, or to the left, it is apparent that shifting of the central portion 17a will be accompanied by an increase in the flux density in the direction in which the member 17 is moving. As a result, rotation of the disk 9', in one direction or the other, will be directly in accord with the direction and magnitude of the displacement of the control member 17. Therefore, should the magnetic member 17, for example, be connected to a thermal responsive element 18, as indicated in Fig. 4, any displacement of this element 18 as a result of the expansion or contraction thereof, could be directly indicated or recorded by the disk 9' in the manner shown in Fig. 2.

In Fig. 5 the gap between the polar projections 5'' of the core 1'' is occupied by a pair of relatively movable magnetic control members 19 and 20. These members 19 and 20 are geared together by a pinion 21 and racks 22, so that upward movement of one member is accompanied by a corresponding downward movement of the other member. With the parts in the neutral position of Fig. 5, the members 19 and 20 are positioned at equal distances from the disk 9'', so that there is no tendency for the disk to rotate as long as the members remain in this position. However, any rotation of the shaft 23 carrying the pinion 21 will result in vertical movement of the members 19 and 20 in opposite directions with resulting rotation of the disk 9'' in one direction or the other in accordance with the variations of the flux distribution through the disk 9''. Obviously, with the arrangement of Fig. 5 any angular displacement of the shaft 23 will result in rotation of the disk 9'', thereby enabling an oscillatory movement of any nature to be recorded and integrated in substantially the same manner as previously described with reference to a differential displacement.

Referring now to Figs. 6 and 7, there is shown an arrangement wherein the magnetic control member is so constructed that magnetic reluctance of the air gap between the member and the disk can be influenced in response to variable factors other than the magnitude under consideration. In this construction a main magnetic member 24 is mounted to turn with the shaft 25 in response to a magnitude, just as does the member 6 in Fig. 1, with the exception that the width of the member 24 is less than the width of the polar projections 5 of the magnetic core. The remainder of the pole face width is occupied by pairs of sector-shaped auxiliary magnetic members 26a, 26b and 27a, 27b free to turn on the shaft 25. As best shown in Fig. 6, the auxiliary magnetic members are identical, and each sub-tends a considerably smaller angle than does the main magnetic member 24. Furthermore, each of the auxiliary members occupies a different angular position with respect to the shaft, so that the air gap between the polar projections 5, as viewed in plan is irregular, although symmetrical with reference to the axis of the shaft 25.

The members 26a and 26b are adapted for movement in unison by links 28 pivotally connected at their ends to lugs 29 provided by the members and to a rod 30. The other pair of members 27a and 27b are similarly connected by links 31, lugs 32 and a rod 33. By vertical movement of the rods 30 and 33, magnetic reluctance of the gap between polar projections 5 can be varied uniformly without causing rotation of the disk 9 which is entirely dependent upon the position of the main magnetic member 24. Therefore, the amount of torque developed in the disk 9 by turning of the member 24 can be modified by shifting the auxiliary members 26a, 26b and 27a, 27b in accordance with variable factors affecting the magnitude being integrated through the control of the main magnetic member 24. That is to say, for different settings of the rods 30 and 33, turning of the member 24 will cause movement of the disk 9 at different rates of rotation all of which however, are proportional to the primary displacement which actuates the main member 24.

Referring now to Figs. 8, 9 and 10, there is shown an arrangement wherein the angular movement of the main magnetic control member in response to the magnitude being studied can be modified by displacement of the control member itself in different planes in response to factors subject to variation in connection with the magnitude under consideration. As best shown in Fig. 8, the shaft 34 supporting the magnetic member 35 is mounted between the arms 36 of a frame 37 that is vertically movable between guides 38 provided by a base 39. The base 39 is in turn movable in a horizontal plane between suitable ways 40, so that the axis of the shaft 34 may be moved up or down, or horizontally within the gap between the polar projections 5, without, however, altering the symmetry of the flux distribution within the gap with the member 35 occupying the position shown in Fig. 8.

As best shown in Fig. 10, the frame 37 is adapted to be moved vertically with respect to the base 39 by means of a plunger 41 connected to a piston within a cylinder 42 mounted on the base 39, and the cylinder 42 is adapted to be supplied through a conduit 43 with any suitable fluid pressure medium under the control of a variable factor. The base 39 carrying the frame 37 is adapted to be moved horizontally by means of a plunger 44 connected to a piston operating in a stationary cylinder 45. Conduits 46 and 47 are adapted to supply any suitable fluid pressure medium to opposite ends of the cylinder 45, so that the base 39 may be moved back and forth under the control of a variable factor or factors adapted to regulate the supply of fluid pressure medium to the cylinder 45 in any suitable manner.

In order to control the angular position of the magnetic member 35, independently of movements of the frame 37 and base 39, the shaft 34 is connected by a flexible coupling 48, so that the angular position of the member 35 is in response to the mechanical displacement under consideration. With the arrangement in Figs. 8, 9 and 10, it is obvious that angular movement of the member 35 may be preceded or accompanied by upward or downward movement of the frame 37, or longitudinal movement of the base 39, either separately or coincidentally in accordance with variations of the factors affecting the supply of fluid pressure medium to the cylinders 42 and 45. While it is obvious that the vertical or horizontal shifting of the member 35 will not of itself cause turning of the disk 9, since such shifting does not disturb the symmetry of the flux distribution in the air gap, it follows that when such shifting accompany angular movement of the member 35, the rate of rotation of the disk 9 caused by the primary displacement will be modified by one or more variable factors, just as shown in Figs. 6 and 7. Thus study of the differential between the heights of the two legs of the mercury column 12 discussed with reference to Fig. 1 may be extended to include consideration of other variable factors such as temperature and humidity, with variations due to all three factors being accurately integrated by the rotative movements of the disk 9. Obviously a fourth factor can be introduced by shifting the core vertically.

Referring now to Fig. 11, there is shown a modification of the basic device of Fig. 1, in which the magnetic control member 49 is of asymmetric form, as compared to the symmetrical form of the member 6. Furthermore, the asymmetric member 49 is mounted to turn with a shaft 50, the axis of which is offset with respect to the central magnetic axis of the core 1. With the member 49 occupying the position of Fig. 11, the distribution of the magnetic fluxes traversing the disk 9 through the differently proportioned air gaps on opposite sides of the shaft 50 is such as to maintain the disk in balance, without rotation. However, upon turning of the member 49 in either direction, the balance will be disturbed and the disk will rotate, although at different rates, as compared to the disk under the control of the symmetrical member 6. Since the flux changes due to rotation of the member 49 are obviously not directly proportional to the degree of angular movement of the member 49, it follows that it is possible to utilize the member 49 to integrate a magnitude having a variation in accordance with a predetermined mathematical function.

Fig. 12 shows a still further modification in the manner of mounting the magnetic control member in the air gap, for the purpose of obtaining a certain amount of regulation of the setting of the magnetic member to maintain the disk stationary. In this arrangement the magnetic control member 51 is mounted on a shaft 52 so that its turning varies the magnetic flux only with reference to the right hand polar projection P—1. The other pole P—2 has a magnetic member 53 associated therewith, which is normally stationary so that with the parts in the position of Fig. 12, there is no rotation of the disk 9. However, by shifting the member 53 laterally with reference to the pole P—2, it is possible to initially set up a condition within the air gap in which equilibrium will be established even with the movable control member 51 turned slightly on its axis, as indicated in dotted lines. Thus, by slightly adjusting the normally stationary member 53 it is possible to compensate for some slight initial angular displacement of the member 51, which otherwise would cause a slight rotation of the disk 9.

In Fig. 13 there is shown an arrangement similar to Fig. 12, in which an asymmetric magnetic member 54 is mounted to turn on a shaft 55. With such an arrangement, the disk 9 will turn in response to angular movement of member 54, although not in direct proportion to the degree of such movement, and the provision of an adjustable magnetic member 58 cooperating with the pole P—2 makes it possible to set up an initial condition of equilibrium in which the disk 9 will remain stationary.

In Fig. 14 the form of the magnetic control member 57, while symmetrical with reference to the axis of the shaft 57a, is altered in such a manner as to cause a non-uniform flux distribution in the air gap, as compared to the member 6. Therefore, angular movement of the member 57 will cause the disk to rotate at speeds different from those of the disk 9.

In Fig. 1a the control member 6a is indicated as being made, in part, of a material 58 having a negative coefficient of magnetic permeability. The purpose of this is to compensate for the increase of flux in the air gap due to an appreciable rise in temperature which would otherwise make the disk run faster.

Referring now to Figs. 15, 16 and 17, there is shown a modification of a device embodying the present invention which operates on a somewhat different magnetic principle. All the devices described with reference to Figs. 1 to 5 inclusive, operate as a result of variations in the intensity of the magnetic flux traversing the rotatable element of an integrating device and the modified devices about to be described differ in that rotative movement of the element, in each case, is caused by variations in the application of the torque component of the magnetic flux.

As best shown in Fig. 15, a disk 59 rotatably mounted on a shaft 60 has a peripheral portion thereof disposed between the polar projections 61 and 62 of a magnetic core 63. The polar projection 61 carries a winding 64 adapted to be energized from a suitable voltage source, and one pole face is slotted at 65 to receive a shading coil 66. The magnetic core 63 is mounted to swing on pivots 67, with the pivotal axis extending through the centers of the pole faces substantially parallel to the disk shaft 60. When the core 63 occupies the position of Fig. 17, the reaction between the core fluxes passing through the disk 59 results in a torque component acting on the disk 59 substantially along a line X—X which passes through the shaft 60, therefore, this torque exerts no turning moment on the disk and the disk remains stationary.

However, should the magnetic core 63 be turned on its pivots 67 so that the line of action of the torque component of the flux extends along the line Y—Y, then the force acts on the disk through an arm represented by the vertical distance between the axis of the shaft 60 and the shifted line of action Y—Y. Therefore, the disk 59 will rotate in a clockwise direction, as indicated by the full arrow as long as the magnetic core is maintained in its shifted position. Obviously, shifting of the core 63 in the opposite direction to throw the line of action of the torque component on the other side of the shaft 50, as indicated at Z—Z will cause the disk 59 to rotate in the direction of the dotted arrow at a rate determined by the length of the arm through which the force works. Therefore, the device is adapted to integrate any magnitude which is translated into angular movement of the magnetic core 63 about its pivotal axis, with the rotation of the disk 59 resulting from variations in the direction of the torque component of the flux rather than its intensity, as in Fig. 1. Furthermore, in the operation of the device of Fig. 17 any back thrust on the core member 63 due to the rotation of the disk 59, passes through the axis of member 63, so there is no reaction opposing the turning of member 63 by the magnitude being integrated.

Referring now to Figs. 18 and 19, there is shown a further modification of the application of the principle illustrated in Fig. 15, which consists in mounting a disk 68 to rotate between the poles of a pair of pivotally mounted magnetic cores 69 and 70, each substantially the same in construction as the core 63. As is evident from Fig. 19, the pivotal axes of the cores 69 and 70 are equidistant from the axis of the shaft 71 of the disk 68, so that when the windings on the cores 69 and 70 are energized, equal and opposite torques are developed on the disk 68, and the disk does not rotate. However, should the core 69 be rotated through an angle of 45°, wherein the line of action of the torque component passes through the shaft 71, then the reaction of the flux produced in the core 70 will cause the disk 68 to rotate in a counterclockwise direction. Obviously, continued turning of the core 69 will cause an increase in the speed of the disk, so that the speed of the disk may be varied from zero to a maximum by rotating the core 69 through an angle of 90°. The same effect can be obtained in the opposite direction of rotation of the disk 68 by turning the core 70 while maintaining the core 69 in its original position.

Referring now to Figs. 20, 21 and 22, there is indicated diagrammatically an arrangement in which the rotation of the disk 59 of Fig. 15 in response to shifting of the core 63 may be modified in response to other variable factors. As indicated in Fig. 20, the distance between the polar projections 61' and 62' is increased and magnetic members 72 and 73 are introduced in the gap between the disk 59' and the pole 62'. As indicated in Fig. 21, the magnetic members 72 and 73 are movable in opposite directions within the air gap so as to vary the flux intensity therein. While shifting of the members 72 and 73 will not cause rotation of the disk 59' as long as the core 63' remains in the position shown, displacement of these members either separately or in unison will modify the effect of the core on the disk 69', so that the disk 59' will rotate at speeds different from the speeds of the disk 59 shown in Fig. 15.

Another way of accomplishing the same result as described with reference to Figs. 20 and 21 is shown in Fig. 22, wherein magnetic members 74 and 75 are mounted on vertical pivots 76 and 77, respectively. These pivots are located outside of the periphery of the disk 59', with the ends of the members 74 and 75 located in the gap between the disk 59' and the polar projection 62'. Therefore, turning of the members 74 and 75 on their axes will also modify the effect of the core on the disk.

With the modified arrangements shown in Figs. 20, 21 and 22, it is apparent then that while rotative movement of the disk is in each case caused by variations in the application of the torque component of the magnetic flux produced by the core, variations in the value of this primary flux can be obtained coincidentally with the shifting of the torque component, as regards the disk, by moving the magnetic members 72 and 73, or 74 and 75, in response to variable factors other than the magnitude controlling the turning of the core 63. Therefore, it may be said that the rotation of the disk 59', as shown in Figs. 21 and 22, is in accordance with variations not only in the application of the torque component of the flux, but also in accordance with variations in the intensity of the flux itself.

Referring now to Fig. 23, there is shown a modified arrangement in which a pair of magnetic cores 78 and 79, substantially identical with the magnetic core 63 of Fig. 15, are mounted on a common yoke 80 shiftable with respect to the axis of a disk 81 by means of a screw 82. With the cores 78 and 79 in the position shown, that is, with their vertical magnetic axes equidistant and symmetrically disposed with respect to a shaft 83 of the disk, there is no tendency for the disk 81 to rotate. This is because the torque components of the magnetic fluxes flowing through the cores 78 and 79 act in the same direction on opposite sides of the disk shaft 83, and at equal distances therefrom, as indicated by the arrows. However, upon shifting of the yoke 80 to move the cores 78 and 79 into the dotted line position, the arm through which one torque component acts is increased, while the arm of the other torque component is decreased, which results in turning of the disk 81 in accordance with the shifting of the magnetic structure carried by the yoke 81, as contrasted to the turning of the magnetic structure on its axis as previously described with reference to the core 63 in Fig. 15.

In Fig. 24 there is shown a modification of a device operating on the same principle as described with reference to Fig. 23, that is, in response to displacement of the magnetic structure. As shown, one magnetic core 84 is stationary, while a second magnetic core 85, identical in construction, is shiftable laterally by means of a screw 86. With the cores 84 and 85 in the position shown, that is, exactly opposite with reference to the axis of the shaft 83' of the disk 81', the torque components of the fluxes are exactly opposed and the disk 81' remains stationary. However, upon shifting of the core 85 in one direction or the other by the screw 86, the arm of the torque component of its flux is increased or decreased, with the result that either the torque component of the flux of core 85 imparts rotation to the disk 81' in a clockwise direction, or the torque component of the flux of core 84 causes rotation of the disk 81' in a counter-clockwise direction.

Referring now to Figs. 25 and 26, there is shown a still further modification of the invention embodied in a device operating on what might be termed a combination of the principles illustrated in Figs. 1 and 15. In this arrangement, two stationary cores 87 and 88, somewhat similar to the core 63, are mounted in opposed relation with reference to a disk 89 mounted on a shaft 90 offset but equidistant from the cores. A magnetic control member 91 is movable with respect to alined gaps 87a and 88a in the cores 87 and 88, which gaps are of substantially the same width as the member 91.

With the member 91 in the position of Fig. 25, that is, symmetrically disposed in the gaps 87a and 88a, there will be no rotation of the disk 89, due to the fact that the torque components of the core fluxes are in balance. However, should the member 91 be shifted to the right in Fig. 25, the resulting increase of flux in the core 87 and the decrease of flux in the core 88 will cause rotation of the disk 89 in a clockwise direction, as indicated by the arrow in Fig. 26. Obviously, shifting of the member 91 to the left will cause rotation of the disk in the opposite direction, so that a varying displacement transmitted to the member 91 will be integrated by rotation of the disk.

Figure 27:
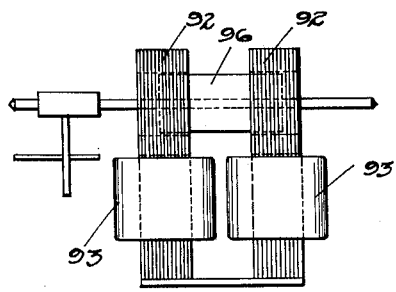
Figure 28:
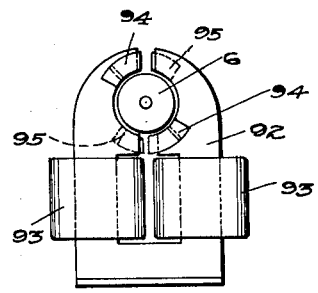
Figure 29:
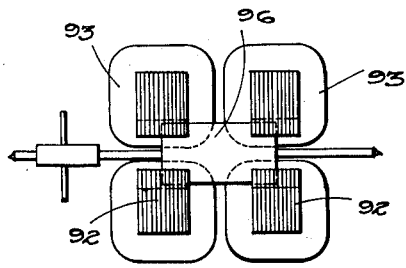

Referring now to Figs. 27 to 29 inclusive, the invention is shown incorporated in a device having a different type of integrating element, although the device operates on the same general principle as the devices previously described. In this modification, a pair of magnetic cores 92 provided with primary windings 93 and oppositely related shading coils 94 and 95 are mounted in spaced relation, with an armature 96 disposed partially within the fields created by both cores. In the position shown in Fig. 27 with the armature symmetrically disposed with respect to the cores 92, the armature is subjected to equal and opposite reactions and does not rotate.

However, should the armature 96 be shifted axially to the right or to the left so that a greater portion thereof is under the influence of one motor field, then the armature 96 will rotate at a speed proportional to its displacement, with the direction of rotation being determined by whichever field predominates. The armature 96 is therefore adapted to integrate such displacements as readily as the disk type of integrating element previously described.

Figure 30:
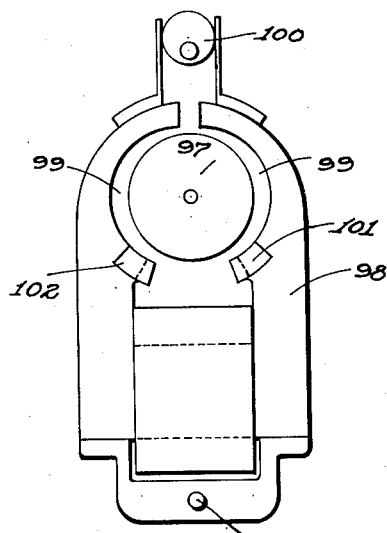
Figure 31:
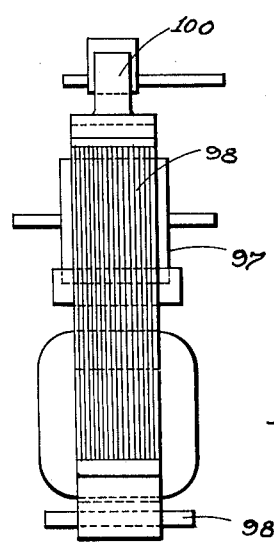

In Figs. 30 and 31 a modification of the motor type of integrator is shown, wherein an armature 97 is rotatably mounted with relation to a single core 98, the polar portions of which are so formed that the air gap 99 is not concentric with respect to the axis of the armature 97. The core 98 is pivotally mounted on a pin 98a and the entire magnetic structure is adapted to be swung about this pivotal axis by means of a cam 100, as shown in Fig. 30.

With the core 98 in the position of Fig. 30, the air gap 99 is symmetrical with respect to the axis of the armature 97, and there is no tendency for the armature to rotate due to the fact that the shaded poles 101, 102 produce equal and opposite reactions on the armature 97. By swinging the core 98 about its pivot through turning of the cam 100, the field on one side or the other of the pivotal axis will predominate and cause the armature 97 to rotate at a speed proportional to the displacement of the magnetic structure.

From the foregoing, it is apparent that by the present invention there is provided an improved measuring and integrating device particularly characterized by the provision of means for imparting a torque to the movable element of an integrating device, which torque is at every instant proportional to the magnitude that is desired to integrate. Consequently, the device is adapted to provide an extremely accurate integration of the instantaneous values of any varying magnitude which may or may not be modified by other varying factors as the case may be. While in the various forms of the invention previously described use is made of the variations in the distribution of a magnetic flux in accordance with the duration of the magnitude being integrated, obviously the invention may take other forms for imparting a torque to a movable element proportional to a magnitude.

I claim:

1. A device of the class described, comprising in combination, a rotatably mounted element forming part of an integrating device, a magnetic structure having a gap therein for receiving a portion of said element, means for energizing said structure to produce a constant magnetic flux which traverses said gap to set up a reaction on said element normally passing through its axis of rotation, means, proportional at all times to the instantaneous values of a varying magnitude, to shift said magnetic structure in order to vary the direction of application of the torque component of the magnetic flux to said element and cause its rotation to continuously integrate the values of said magnitude, and other means to simultaneously vary the value of the flux traversing said gap in proportion to a varying magnitude other than the magnitude being integrated.

2. An electric motor of the induction type, for use in combination with an integrating device comprising a rotatably mounted element, a magnetic circuit having a gap therein in which is received a portion of said rotatable element, means for causing a constant flow of magnetic flux through said circuit, which flux normally traverses said element so that its reaction exerts no turning moment on said element, means for turning the magnetic circuit about an axis extending through said rotatable element to vary the direction of application of said flux reaction with respect to the rotational axis of said element so as to cause rotation of the latter in proportion to the degree of such turning, and additional means for varying the flux density in said circuit, simultaneously with its turning, so as to further control the rate of rotation of said element.

ERNEST S. JEFFERIES.